United States Patent [19]

Sweers

[11] Patent Number: 4,822,092
[45] Date of Patent: Apr. 18, 1989

[54] COMPOSITE ANCHOR ATTACHING ARRANGEMENT FOR VEHICLE SEAT

[75] Inventor: Michael J. Sweers, Williamston, Mich.

[73] Assignee: Chrysler Motors Corporation, Highland Park, Mich.

[21] Appl. No.: 174,047

[22] Filed: Mar. 28, 1988

[51] Int. Cl.$^4$ .............................................. B60N 1/00
[52] U.S. Cl. .................................. 296/63; 248/503.1; 24/662; 297/250
[58] Field of Search .................... 296/63, 65; 297/250, 297/440, 452; 292/341.17, 303; 248/503.1; 24/662

[56] References Cited

U.S. PATENT DOCUMENTS

| | | | |
|---|---|---|---|
| 3,915,493 | 10/1975 | Brown | 296/63 |
| 3,924,892 | 12/1975 | Geier | 296/63 |
| 4,742,984 | 5/1988 | Cote et al. | 297/452 |

FOREIGN PATENT DOCUMENTS 1574372  9/1980  United Kingdom.

Primary Examiner—Joseph F. Peters, Jr.
Assistant Examiner—Jesús D. Sotelo
Attorney, Agent, or Firm—Edward P. Barthel

[57] ABSTRACT

A seat cushion frame is mounted on a vehicle floor panel by a composite anchor member adapted to be snap-fitted into position in a panel aperture. The anchor member includes a plastic lower shell part bonded to an upper rubber seal ring part. The shell part has an oval-section hollow socket portion with its upper open end, adapted to receive a frame mounted striker, formed with a peripheral inverted U-section collar portion ending in a V-section terminal spring flange. The rubber seal ring provides a right-angled section defining a horizontal sealing lip portion and vertical neck portion formed with a resilient shoulder adapted to lockingly engage the rolled edge of the floor panel aperture. The seal ring part is formed with a U-shaped loop bonded to the inner surface of the shell socket defining vertically disposed wedge-shaped ribs having opposed ramp faces establishing a lead-in gaped notch. Upon the striker bight portion being received in the notch and pushed downwardly the resultant wedging action causes the shell socket and opposed collar portions to deform outwardly allowing the bight portion to snapingly pass through the gap for locking capture in the anchor member.

2 Claims, 2 Drawing Sheets

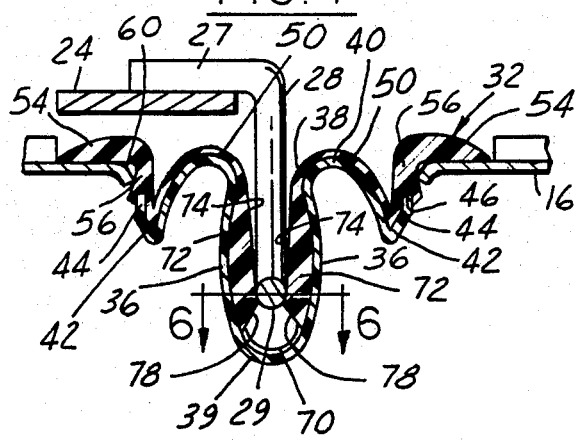
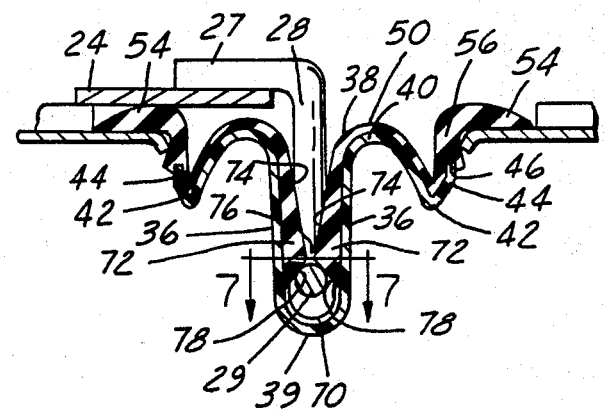
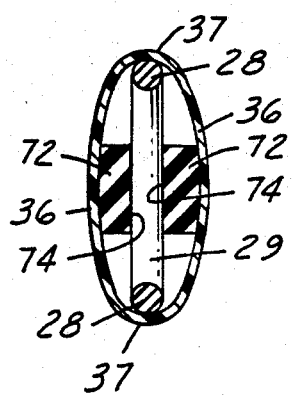
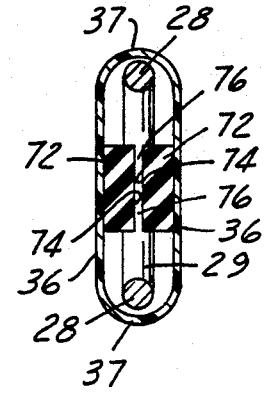
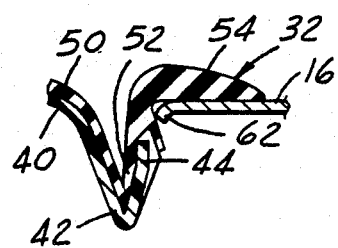
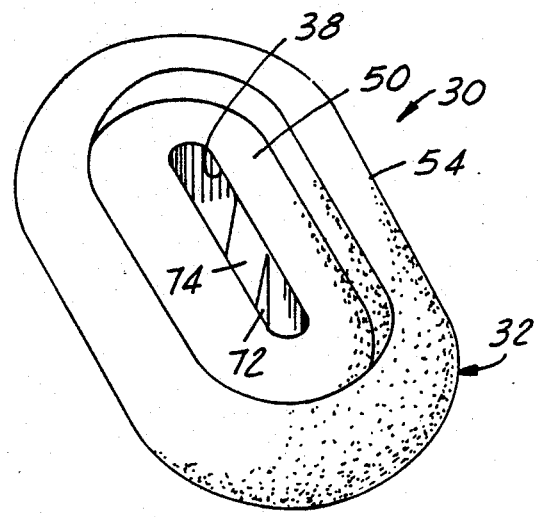
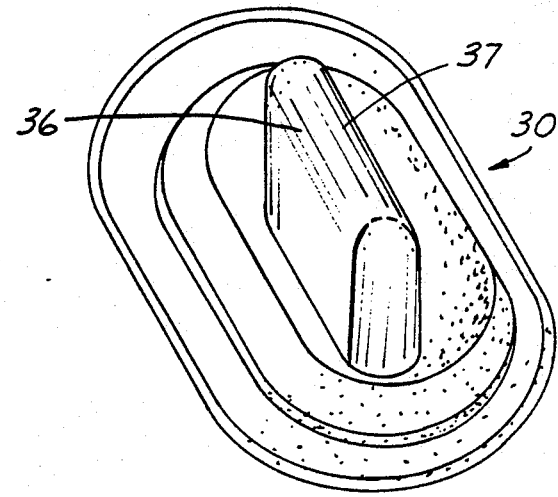

COMPOSITE ANCHOR ATTACHING ARRANGEMENT FOR VEHICLE SEAT

This invention relates generally to attachment devices for vehicle seats and more particularly to such an arrangement that utilizes a striker and a composite plastic and rubber self-sealing anchor member in combination for readily securing a rear seat structure to the vehicle body.

BACKGROUND OF THE INVENTION

Various arrangements have heretofore been used for securing the seat cushion of an automobile to the vehicle body. An example of one such arrangement is found in the U.S. patent application Ser. No. 7/077,272 filed July 24, 1987, entitled Attaching Arrangement for Vehicle Seat Cushion, now U.S. Pat. No. 4,742,984 to Cote et al. The Cote et al. patent discloses a vehicle seat cushion plastic anchor member adapted to be snap-fitted into a vehicle floor panel aperture by means of locking fingers. The Cote et al. anchor member is molded into a oval-sectioned tubular open-ended body with the interior of its side walls formed with parallel mutually opposed pairs of ribs defining a pair of spaced upwardly open V-shaped notches. The lower ends of each pair of ribs are interconnected by mutually opposed base flanges defining an elongated gap therebetween with each flange undersurface sloped upwardly providing an inverted V-shaped locking catch adapted to capture a seat frame striker upon the striker being forcefully pushed downwardly into the V-notches allowing the striker to snappingly pass through the gap.

The British Pat. No. 1,574,372 to Kuno et al., and published Sept. 3, 1980, is an example of another automobile seat fastener device comprising a plastic body having a retaining collar and retaining fingers to mount the body in a floor aperture.

SUMMARY OF THE INVENTION

A primary object of the present invention is to provide an improved quick connect mounting arrangement for an automotive seat structure, including a composite plastic and rubber self-sealing anchor member adaptable to be snap-fitted into position in an associated vehicle floor panel aperture by means of a self-sealing rubber ring lip flange. The composite anchor assembly comprises a synthetic resin plastic lower shall part bonded to an upper peripheral rubber seal ring part. The shell part includes a hollow socket body portion, having an oval-shaped horizontal section, molded of flexible plastic material formed with a closed lower end and an open upper end. The open upper end is operative to receive the bight portion of a U-shaped striker depending from the seat structure.

The shell body portion upper open end is formed with a continuous peripheral inverted U-shaped arcuate collar portion ending in an outer V-section terminal flange. The rubber seal ring part includes a stirrup-like U-shaped integral loop portion bonded to the inner surface of the plastic shell socket. The loop interior is formed with opposed wedge-shaped integral ribs defining therebetween a lead-in upwardly opening V-shaped notch providing an uniform elongated gap. The V-shaped notch is adapted to receive the bight portion of a U-shaped striker extending downwardly from a supporting portion of a seat cushion frame.

Upon the striker bight portion being forcefully pushed downwardly into the V-shaped notch a wedging action causes the hollow socket flexible side wall portions to resiliently bow outwardly in response to the flexing of the collar and V-sectioned spring flange allowing the striker to pass through the gap. The striker is captured by snapping it in an inverted V-shaped locking catch formed by the wedge shaped portions undersurfaces which are each slanted upwardly toward the interior of the hollow socket. It is thus a feature of the present invention to provide a composite anchor member operative to sealing inclose the striker member and vehicle body aperture obviating the passage of moisture into the vehicle.

Another feature of the invention is to provide an composite anchor member as set forth above having a resilient locking arrangement which isolates and dampens vibrations applied to the attachment device while obviating possible noise related play between the parts.

It is still another object of the invention to provide a composite anchor member as set forth above which is readily locked in place without the use of installation tools.

BRIEF DESCRIPTION OF THE DRAWINGS

The objects, features and advantages of the present invention are readily apparent from the following detailed description of the best mode taken in conjunction with the accompanying drawings in which:

FIG. 4 is a fragmentary vertical sectional view taken substantially on the line 4—4 of FIG. 3 showing the striker partially inserted in the anchor;

FIG. 5 is a fragmentary vertical sectional view taken on the line 5—5 of FIG. 3 showing the striker in the locked position;

FIG. 6 is a horizontal sectional view taken on locked position;

FIG. 6 is a horizontal sectional view taken on the line 6—6 of FIG. 4;

FIG. 7 is a horizontal sectional view taken on the line 7—7 of FIG. 5;

FIG. 8 is an enlarged fragmentary sectional view taken on the line 8—8 of FIG. 2;

FIG. 9 is an enlarged perspective view of the composite anchor upper end; and

FIG. 10 is an enlarged perspective view of the composite anchor lower end.

DETAILED DESCRIPTION OF THE PREFERRED EMBODIMENT

Figure 1:
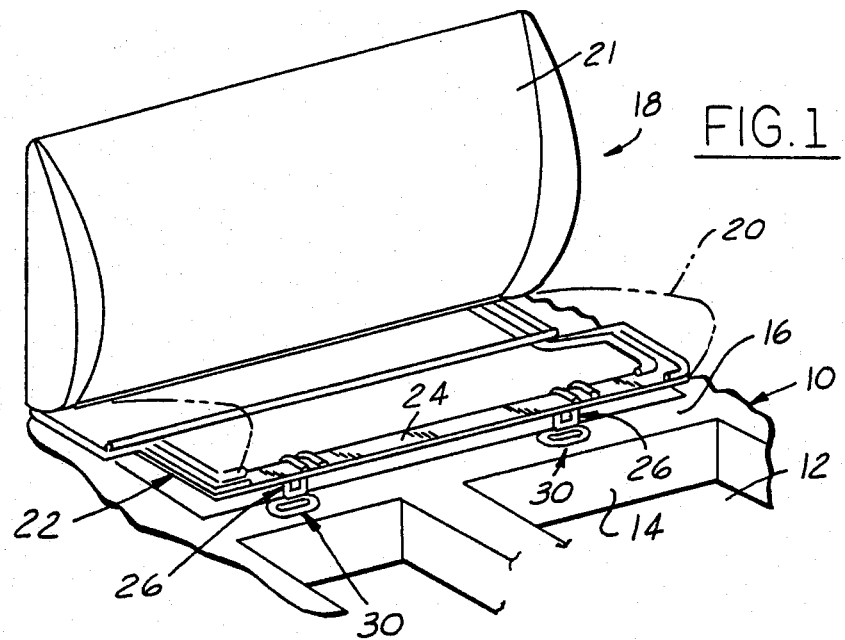
FIG. 1 is a partial front perspective view of a vehicle having a rear seat cushion attachment arrangement according to this invention.

Referring now particularly to FIG. 1 of the drawing, a vehicle 10 includes a floor pan 12 formed with a rear kickup area having angled vertical wall 14 and an intermediate generally horizontal floor panel 16. The floor pan 12 is conventional and forms no part of this invention. A vehicle rear seat indicated generally at 18 includes a seat cushion shown in phantom lines at 20 and a back rest 21 of conventional structure. The seat cushion 20 comprising a frame 22 having a front transverse frame member 24.

A pair of U-shaped strikers 26 are shown in FIG. 1 each formed with a pair of horizontally extending right-angled fingers 27 (FIG. 2) welded to the upper surface of the frame member 24. Each striker has a pair of legs 28 extending vertically downwardly from its fingers 27 terminating in a transverse bight portion 29 adapted to be lockingly received in a composite anchor or retainer member, generally indicated at 30.

Figure 2:
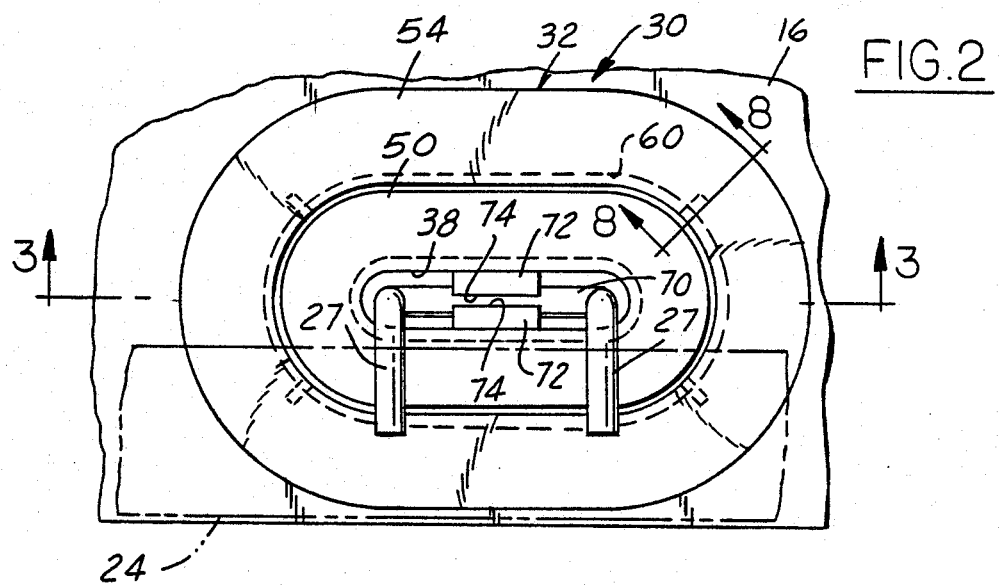
FIG. 2 is an enlarged fragmentary top elevation view of one of the attachment arrangements of FIG. 1.
Figure 3:
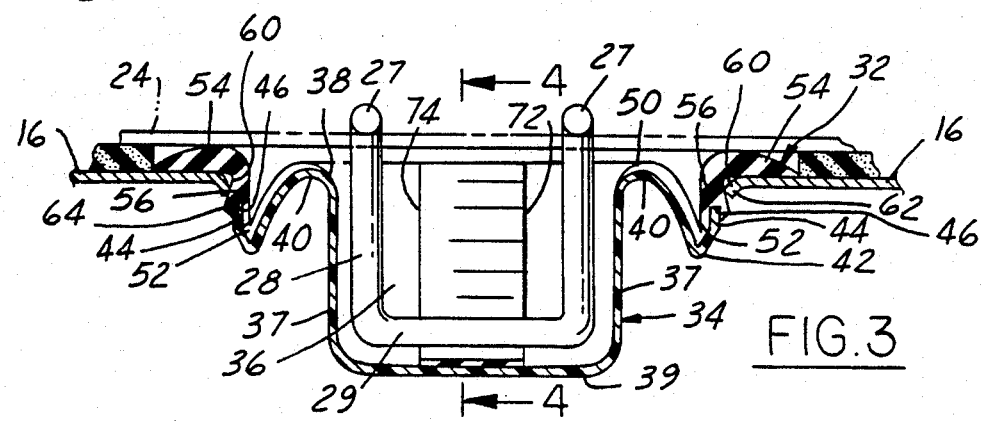
FIG. 3 is a fragmentary vertical sectional view taken substantially on the line 3—3 of FIG. 2.

As seen in FIGS. 2 and 3 the composite anchor member 30 comprises an upper rubber seal ring part or segment 32 integrally bonded by suitable means to a lower central synthetic resin plastic part or segment 34. The lower plastic part is in the form of an elongated hollow socket having an oval-shape in horizontal section defined by a planar side wall portions 36 interconnected by arcuate or half-round end wall portions 37. The hollow socket defines an oval-shaped open upper entrance 38 and a bottom is closed by a downwardly convex or dome-shaped bottom wall portion 39.

The side and end wall portions 36 extend vertically downward from an inverted U-shaped peripheral collar portion 40. The collar portion 40, which has an upwardly convex arcuate vertical profile ends in an outer V-section spring flange portion 42. The V-section spring flange portion 42 terminates in an upwardly directed terminal flange portion 44 parallel with the side wall portion 36. The terminal flange 44 is bonded within a downwardly opening recess 46 formed in the rubber sealing ring 32.

The upper rubber seal ring part 32 includes an overlaying skin or thin film portion 50 bonded to and conforming with the upper surface of the collar portion 40. The film portion 50 inner terminus defines in-part the socket central elongated entrance 38. The overlying film portion 50 is joined to a peripheral right-angle section of the seal ring 32 by an integral reverse-fold film portion 52 bonded to and conforming with the upper surface of the spring flange 42. The seal ring right-angle section is defined by a horizontal lip portion 54 and a vertical neck portion 56. As seen in FIG. 2 the anchor member oval-shaped entrance 38 is sized to receive the striker bight portion 29 therethrough.

In FIGS. 2 and 3 the floor panel 16 is shown having an oval-shaped aperture 60, bordered by a downturned or rolled edge 62, shaped to snugly receive the seal ring part 32 therein. It will be noted that the rubber sealing ring part 32 neck portion 56 extends around the periphery of the floor panel aperture 60 and is formed with continuous outer conical-shaped resilient locking shoulder 64. The locking shoulder 64, resiliently biased outwardly by the shell part flexible collar 40 and spring flange 42, is adapted by its size to be initially flexed inwardly allowing passage through the aperture 60. Upon contact by the lip portion 54 the shoulder 64 snaps outwardly to sealingly engage the aperture rolled edge 62 for locking engagement therewith. This results in the sealing member lip portion 54 being held in positive sealing engagement with the upper surface of the floor panel 16.

While the striker and anchor member combination disclosed herein offers particular advantages when utilized in paired installations for seat mounting it is to be appreciated that such striker anchor mountings might be used singly or in multiple combinations other than as illustrated.

It will be noted in FIG. 2 that the composite anchor assembly member 30 is formed symmetrical about a vertically disposed longitudinally extending plane of symmetry indicated by dashed section line 3—3.

As best seen in FIGS. 2, 3, 4 and 6 the rubber sealing ring part thin film portion 50 includes an integrally molded stirrup-like thin loop portion 70 defining a pair of vertically disposed transversely opposed wedge shaped integral ribs 72. The pair of ribs 72 have converging surfaces 74 sloped downwardly and inwardly toward the plane of symmetry so as to define with its mutually opposed rib a V-shaped lead-in notch. The resultant V-shaped notch terminates in a longitudinally extending slotted opening or elongated gap 76. The ribs 72 have their undersurfaces 78 sloped upwardly toward the elongated gap 76 defining a shallow inverted V-shaped locking catch adapted to capture the striker transverse bight portion 29.

As best seen in FIG. 5, the elongated gap 76 has a predetermined transverse dimension sized to normally prevent the passage of the striker bight portion 29 therethrough. With reference to FIG. 4, the striker bight portion 29 is initially received in its associated anchor member V-shaped lead-in notch for guided engagement with its pair of ramp sloped edges 74. Each striker bight portion 29 is forcefully pushed downwardly resulting in a wedging action. As seen in FIG. 6, this action causes the shell member side wall portions 36 to deform outwardly or expand from the plane of symmetry, defined by section line 3—3. As a result, the elongated gap 76 widens allowing the striker bight portion 29 to pass therethrough so as to be snappingly captured in the inverted V-shaped locking catch defined by sloped undersurfaces 78.

It will be noted in FIG. 4 that the resilient lip flange 54, having a predetermined minimal thickness, is provided on the upper surface of the floor panel 16. The striker member legs 28 are designed to extend downwardly from the transverse frame member 24 a predetermined distance. Thus, upon each striker member bight portion 29 being snappingly captured in its associated inverted V-shaped catch, defined by surfaces 78, the sealing member lip portion 54 is compressed between the transverse member 24 and the vehicle floor panel 16. The resultant compressive force acts to resiliently bias the striker horizontal bight portion 29 into its inverted V-shaped catch thereby dampening out vibrations to which the seat is subjected.

Although only one embodiment of the subject invention has been illustrated and described, modifications and variations of the invention will readily come to mind of a person skilled in the art which modifications and variations do not fall outside the scope of the invention as defined hereinafter.

What is claimed is:

1. In combination with a vehicle floor panel, a composite anchor assembly for securing a seat cushion frame to the vehicle floor panel, a U-shaped striker depending vertically downwardly from said frame and terminating in a transverse bight portion, said floor panel having an oval-shaped aperture therethrough defined by a downturned rolled edge bounding said aperture for receiving said anchor member, said anchor member in the form of an improved composite two-part anchor assembly comprising:

a lower shell part molded of synthetic resin flexible plastic formed with an open upper end and a closed lower end, said socket portion normally being elongated oval-shaped in horizontal section defining parallel planar opposed side wall portions interconnected by arcuate end wall portions, said shell part formed symmetrical about a vertically disposed longitudinally extending plane of symmetry, said shell part further comprising an integral flexible inverted U-section arcuate collar portion extending continuously around said socket portion open upper end, said collar portion terminating in an outer V-section spring flange having an upwardly directed continuous outer terminal flange portion positioned vertically below the apex of said collar portion;

a molded rubber sealing part having a right-angle section extending around the periphery of said floor panel aperture, said right-angle section comprising a horizontal resilient lip flange portion having its downwardly facing surface in sealing contact with the upper surface said floor panel;

said right-angle section further comprising a vertical neck portion having its outer surface formed with an outwardly diverging resilient shoulder lockingly engaging said aperture rolled edge, said neck portion terminating in an integral thin film portion confirming with and bonded to the upper surface of said V-section spring flange and said inverted U-section collar portion;

said thin film portion molded with a transverse U-shaped loop portion bonded to shell part socket portion associated side walls and bottom wall contiguous inner surfaces, said U-shaped loop portion molded with vertically disposed wedge-shaped ribs having transversely opposed ramp faces that slope downwardly providing a lead-in V-shaped notch defining a longitudinally extending gap having a predetermined transverse dimension normally preventing the passage of said striker bight portion therethrough, each said rib having its undersurface sloped upwardly toward said gap defining a shallow inverted V-shaped locking catch adapted to capture said bight portion;

whereby upon said striker bight portion being received in said lead-in V-shaped notch and being forcefully pushed downwardly resulting in a wedging action cauding said socket portion sidewalls to deform outwardly from said plane of symmetry by virtue of their associated collar portions flexing outwardly about their associated collar portions flexing outwardly about their respective spring flanges, such that said gap allows said bight portion to snappingly pass therethrough so as to be captured in said inverted V-shaped locking catch.

2. The combination as set forth in claim 1, wherein said resilient lip flange portion located intermediate said frame undersurface and said floor panel, and said U-shaped striker having vertically extending leg portions of a predetermined length such that upon said bight portions being captured in said inverted V-shaped locking catch said resilient lip flange portion is compressed between said frame undersurface and said floor panel, a resultant force exerted by said compressed resilient lip flange portion acts to resiliently bias said striker bight portion upwardly into said inverted V-shaped locking catch thereby dampening out vibrations to which said seat is subjected.

* * * * *

UNITED STATES PATENT AND TRADEMARK OFFICE

Certificate

Patent No. 4,822,092             Patented: Apr. 18, 1989

On petition requesting issuance of a certificate for correction of inventorship pursuant to 35 USC 256, it has been found that the above-identified patent, through error without any deceptive intent, improperly sets forth the inventorship. Accordingly, it is hereby certified that the correct inventorship of this patent is:
Michael J. Sweers, Williamston, Mich.; Wilbur E. Schwarts, Jr., Dearborn Heights, Mich.

Signed and Sealed this Twelfth Day of June, 1990.

JOSEPH E. PETERS, Jr.

*Supervisory Patent Examiner*
*Art Unit 315*